US009693210B2

(12) United States Patent
Sennett et al.

(10) Patent No.: US 9,693,210 B2
(45) Date of Patent: Jun. 27, 2017

(54) CUSTOMIZING WIRELESS EMERGENCY ALERT MESSAGES USING NETWORK ANALYTICS

(71) Applicant: AT&T Intellectual Property I, L.P., Atlanta, GA (US)

(72) Inventors: DeWayne A. Sennett, Redmond, WA (US); Brian Kevin Daly, Peachtree Cors, GA (US); Charles Peter Musgrove, Henderson, NV (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/885,723

(22) Filed: Oct. 16, 2015

(65) Prior Publication Data

US 2017/0111779 A1    Apr. 20, 2017

(51) Int. Cl.
  *H04B 15/00*    (2006.01)
  *H04W 4/22*    (2009.01)
  *H04W 4/06*    (2009.01)

(52) U.S. Cl.
  CPC .............. *H04W 4/22* (2013.01); *H04W 4/06* (2013.01)

(58) Field of Classification Search
  CPC ... H04W 28/0289; H04W 4/22; H04W 28/16; H04W 72/005; H04W 72/00; H04W 48/10; H04W 76/007; H04W 68/00
  USPC .......... 455/404.1, 404.2, 503; 370/270, 312, 370/389, 390, 432
  See application file for complete search history.

(56) References Cited

U.S. PATENT DOCUMENTS

| | | | |
|---|---|---|---|
| 8,063,766 B2 | 11/2011 | Daly et al. | |
| 8,190,118 B2 | 5/2012 | Sennett et al. | |
| 8,326,260 B1 | 12/2012 | Bradish et al. | |
| 8,660,518 B2 | 2/2014 | Sennett et al. | |
| 8,666,358 B2 | 3/2014 | Qu et al. | |
| 8,825,097 B2 | 9/2014 | Sennett et al. | |
| 8,989,698 B2 | 3/2015 | Fan et al. | |
| 9,071,948 B2 | 6/2015 | Sennett et al. | |
| 9,161,176 B2 | 10/2015 | Alberth, Jr. et al. | |
| 2008/0194224 A1 | 8/2008 | Thorson et al. | |
| 2012/0208492 A1 | 8/2012 | Tschofenig et al. | |
| 2012/0276864 A1* | 11/2012 | Sennett ................. | H04M 11/04 455/404.2 |
| 2014/0120861 A1 | 5/2014 | Kwak et al. | |
| 2014/0315511 A1 | 10/2014 | Cha et al. | |
| 2014/0329490 A1 | 11/2014 | Sennett et al. | |

(Continued)

*Primary Examiner* — Ronald Eisner (57) ABSTRACT

A method, computer-readable medium, and apparatus for broadcasting a wireless emergency alert message are disclosed. For example, a method may include a processor receiving a request to broadcast a wireless emergency alert message, determining an anticipated increase in a network usage in response to broadcasting the wireless emergency alert message, determining that a capacity of the network will not be exceeded with the anticipated increase in the network usage, and broadcasting the wireless alert message in an alert area. In one example, the request comprises a type of alert, the alert area, and a message content. In one example, the wireless emergency alert message that is broadcast includes the message content in a format that deviates from a default format when it is determined that the capacity of the network will not be exceeded with the anticipated increase in the network usage.

20 Claims, 4 Drawing Sheets

(56) References Cited

U.S. PATENT DOCUMENTS

| | | |
|---|---|---|
| 2015/0036586 A1 | 2/2015 | Oh et al. |
| 2015/0067727 A1 | 3/2015 | Velazquez |
| 2015/0110255 A1 | 4/2015 | Williams et al. |
| 2015/0140924 A1 | 5/2015 | Marathe et al. |
| 2015/0237489 A1 | 8/2015 | Aoyagi et al. |
| 2015/0296361 A1 | 10/2015 | Sennett et al. |

* cited by examiner

CUSTOMIZING WIRELESS EMERGENCY ALERT MESSAGES USING NETWORK ANALYTICS

The present disclosure relates generally to methods, computer-readable media and apparatuses for broadcasting a wireless emergency alert message.

BACKGROUND

The Wireless Emergency Alert (WEA) system is capable of providing messages indicative of a variety of types of alerts. Via the WEA system, mobile devices can receive messages pertaining to weather conditions, disasters, child abduction America's Missing: Broadcast Emergency Response (AMBER) alerts, and any alerts for imminent threats to life or property issued by authorized government entities, for example. Due to broadcast capabilities, bandwidth constraints, and limitations of mobile devices (e.g., limited number of characters displayable on the mobile device), the size of the WEA message may be limited, e.g., to 90 characters. Thus, the limitation placed upon the size of a WEA message can be problematic.

SUMMARY

In one example, the present disclosure discloses a method, computer-readable medium, and apparatus for broadcasting a wireless emergency alert message by a processor. For example, the processor may receive a request to broadcast a wireless emergency alert message, determine an anticipated increase in a network usage in response to broadcasting the wireless emergency alert message, determine that a capacity of the network will not be exceeded with the anticipated increase in the network usage, and broadcast the wireless alert message in an alert area. In one example, the request comprises a type of alert, the alert area, and a message content. In one example, the wireless emergency alert message that is broadcast includes the message content in a format that deviates from a default format when it is determined that the capacity of the network will not be exceeded with the anticipated increase in the network usage.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and apparatuses for broadcasting a wireless emergency alert message and for providing alternative or additional information for a message content of wireless emergency alert message. The Wireless Emergency Alert (WEA) system is a set of network components, protocols, and interfaces that enables authorities to send alerts to mobile devices of a cellular network in a designated alert area. WEA messages, may pertain to such things as geophysical events, such as a landslide, meteorological events, such as windstorms, tornados, hurricanes, tsunamis, lightning storms, thunderstorms, hurricanes, freezing rain, blizzards, fog, etc., child abductions, chemical, biological, radiological, nuclear or explosive (CBRNE) threat or attack, or the like.

In general, an authorized alert originator, such as a governmental agency, is responsible for the generation request to broadcast a WEA message and submit the request to a cellular network. The request may include a message content for the WEA message and a designation of an alert area. The request may also include a duration of time for which the alert is applicable and a designation of a category of the alert and/or a specific alert type. For instance, under Federal Communication Commission (FCC) guidelines a WEA message (other than a presidential alert) should include five information elements: an event type, an area affected, a recommended action, an expiration time (with time zone), and a sending agency. In addition, in one example, WEA messages may have a fixed designated size/length of 90 characters of alphanumeric text. For example, 90 characters have been designated as a standard WEA message size by the FCC. In accordance with the present disclosure, and as described in greater detail below, a request to broadcast a WEA message may include alternative or additional information for the message content.

In one example, after receiving a request to broadcast a WEA message, a cellular network may then broadcast the WEA message via wireless broadcast transmissions from cell towers covering the alert area, e.g., the "area affected" in alerting terminology. In one example, users do not subscribe to WEA messages. Instead, WEA message may be delivered to and received by all mobile devices that are capable of receiving WEA messages within an alert area. In one example, the WEA messages are sent on dedicated broadcast channels to all mobile devices in an alert area. In one example, a WEA message may be received by a mobile device, but not presented to the user based upon a configuration of the mobile device and the category or type of WEA message. For instance, a user may elect to not receive AMBER alerts at the user's mobile device.

In one example, the present disclosure uses various aspects of current and past network analytic information to determine whether a message content of a WEA message may deviate from a standard, or default format. The current network analytic information may comprise such things as the current network capacity, or current network usage/load in a portion of a network pertaining to an alert area, a number of mobile devices registered in the alert area, the types and proportions of different types of network traffic in the portions of the network related to the alert area, a level of non-cellular wireless coverage in the alert area, and so on. Historical network analytic information may comprise various measures of network performance following the broadcasting of previous WEA messages of a same or similar type as a current WEA message, various measures of network performance following the broadcasting of previous WEA messages of a same or similar type as a current WEA message that included a particular type of content that deviates from a default WEA message format, and so on. For instance, historical information may indicate how the network usage has been affected in the past by the same type of WEA message as a current WEA message, how the network usage has changed when a telephone number, a web page hyperlink, a video link, or other media has been included in a WEA message in the past, and similar criteria.

In one example, an anticipated increase in network usage may be calculated with respect to a WEA message having message content that conforms to a default format. In one example, if the current network usage plus the anticipated increase in network usage does not exceed a capacity of the network, then the WEA message content may be permitted to deviate from the default format. In one example, an anticipated increase in network usage for a WEA message with a message content having particular type of deviation from a default format may be calculated. If the current network usage plus the anticipated increase in network usage based upon the broadcast of the WEA message with the message content having the particular type of deviation from the default format does not exceed a capacity of the network, then the WEA message content having the particular type of deviation may be authorized. In one example, an anticipated increase in network usage may include the anticipated network utilization related to broadcasting the WEA message as well as the anticipated network utilization related to mobile device users performing certain expected actions in response to receiving the WEA message.

In one example, a deviation of a WEA message content from a default format may comprise additional information or alternative information being sent in connection with the WEA message, e.g., in addition to or as an alternative to a default or minimum guaranteed 90 characters. For example, an alert originator may wish to not only provide a warning as to an imminent threat to life or safety, but may also desire to provide instructions for action in response to the threat. Thus, in one example, a default 90 characters of a WEA message content may be used to convey that there is a tornado approaching, to give its current location and trajectory, and to identify the alert generator. The WEA message may also provide a limited recommended action, e.g., "take shelter." Possible additional information for the WEA message content may then include more detailed instructions for responding to the threat. For example, different sets of targeted instructions may be provided in a single broadcast message for recipients who are already indoors, those travelling in vehicles, those who are outside in an urban environment, those who are in open spaces, and so forth. In another example, the additional or alternative information may comprise various types of media, such as an image, a video content, an audio content, or a link to a network resource comprising various possible types of media. For example, the alert originator may wish to provide a map of an alert area with an evacuation plan illustrated on the map. Similarly, the alert originator may wish to provide basic instructions on how to take shelter from a tornado by providing a uniform resource locator (URL) or other link to a server, a webpage, a document, a video, and so forth that helps describe how to respond to a tornado. If information regarding the event is also being broadcast via radio and television, the additional information may also provide details on an appropriate channel or frequency. For example, if the WEA message is a weather alert originated by the National Weather Service (NWS) of the National Oceanic and Atmospheric Administration (NOAA), the WEA message could indicate that further details are available on the NOAA National Weather Alert Radio and indicate the available weather radio channels.

In one example, certain types of deviations may be permitted, while other types of deviations are not. For instance, it may be determined that an anticipated increase in network usage when a URL is provided would cause the network capacity to be exceeded. For instance, the network may have the capacity to broadcast a WEA message with a URL relating to video instructions, but historical network analytic information may indicate that a significant number of recipients of the WEA message are expected to activate the URL to watch the video instructions. Thus, the network may not be able to handle the increased usage if a large number of mobile devices were to attempt to stream the video instructions. On the other hand, it may be calculated that including further text instructions in addition to basic information regarding a threat would not be anticipated to cause the network capacity to be exceeded. Thus, additional text instructions may be permitted, while providing a URL may be denied.

In one example, after a decision is made as to whether the WEA message content may deviate from a default format, the decision may be conveyed to the alert generator in a notification. The alert generator may then opt to include additional or alternative information, e.g., with respect to a minimum 90 character allotment, when the notification indicates permission to do so. In another example, in a request to broadcast a WEA message, an alert generator may include a first WEA message content that conforms to a default format, and may further include additional or alternative information that it would prefer to have broadcast. If it is determined that the WEA message content may deviate from the default format, the additional or alternative information may be broadcast, e.g., without waiting to send a notification to the alert generator and without waiting to receive a response containing the alternative or additional content. Otherwise, a portion of the message content that conforms to the default format may be transmitted, and any alternative or additional information may be discarded.

The current and historic network analytic information may also be used by a network operations center to anticipate an increase in network usage as a result of a WEA message, and in some case the inclusion of specific types of additional information in the WEA message, in order to adjust various network operating parameters. For example, a network may currently be peaking and not be able to handle an anticipated spike in call traffic. For instance, a WEA message may relate to an incoming tornado. In addition, it may be the case that in the past, the network has typically been flooded with phone calls by recipients of tornado alerts. In this case, upon receipt of a request to issue a WEA message from an alert originator, a network operator may be informed that in response to the WEA message, a significant spike in call traffic is expected. In one example, the network adjustment may be automated by a network controller by receiving the request to issue a WEA message, examining the current network usage, determining an anticipated increase in network usage following a broadcasting of the WEA message (the WEA message relating to a particular type of threat or having a particular WEA message type for which there is historical network analytic information), and restricting WEA message content automatically if the current network usage plus the anticipated increase in network usage exceeds a peak operating capacity of the network or other threshold.

The following comprises a more detailed description of some of the various types of network analytic information or parameters that may be utilized in accordance with the present disclosure. For instance, a first parameter may comprise a number of cell sites in an alert area. A small number of cell sites, e.g., less than five, could indicate a small localized event in an urban environment. Therefore, more detailed and specific information may be appropriate. A large number of cell sites which are geographically diverse, e.g., hundreds or thousands, could indicate a widespread event such as a hurricane. Therefore, general and more generic information may be appropriate. Another parameter may comprise a population density or a number of mobile devices registered on cell sites within the alert area. Population density could indicate whether the threat is an urban event or a rural event. The population density may be a factor in the assessment of potential network congestion as a result of notification of the event. If network congestion is likely, the WEA message content should not contain information that would aggravate potential network congestion conditions. Another parameter may comprise current network traffic load for voice, data, and control channels. For example, if the network already has a high network traffic load, the WEA message content should not contain information that would significantly increase the already high network traffic load and potential induce network congestion conditions.

Still another parameter may relate to the type of threat or event. For example, the threat may be classified as a minor event or a major event. In addition, an expected subscriber reaction may be calculated. For example, a major event may be considered more likely to result in a greater percentage of WEA message recipients placing calls to friends and family after receiving the WEA message. Another parameter may comprise historical data pertaining to user reactions to events. For example, historical information may reveal that a certain percentage of the users may try to access web servers for more information and/or try to place calls to friends and family in response to receiving certain types of WEA messages. Another parameter may comprise a location and a frequency of occurrence of an event. For example, ice storms or snow storms in Chicago are more frequent events than ice storms or snow storms in Atlanta. Thus, reaction of the people in Chicago will be different than the reaction of people in Atlanta as revealed through historical network usage information in the wake of one or more past WEA messages in the respective areas.

Another parameter may relate to an identity of an alert originator. For example, less network traffic may result if users generally recognize and trust the source of a WEA message. Otherwise, users may rely upon various voice or data services to validate the information provided by the source. Another parameter may comprise an indicated duration of an event. For example, if a request to broadcast a WEA message indicates a warning for a severe thunderstorm with a duration of 30 minutes or less, the user reaction and network utilization may be different than if the WEA message relates to a hurricane and has an indicated duration of several hours.

Another parameter may relate to network impacts from previous similar events. A majority of WEA messages may be weather related, and these weather conditions reoccur many times. Consequently, historical network analytic information may be able to predict the network impacts of a present occurrence of an event, whether related to a weather event or other type of threat. Still another parameter may relate to potential risks to the network. Past network analytic information may reveal various outages and degradations of the network in response to similar past events. An earthquake would be an example of an event with a high risk to the network.

Another parameter relates to the availability of alternative connections, e.g., another cellular network, or non-cellular networks, such as wireless local area networks (WLANs). The availability of alternative connections may allow for more information to be sent to the mobile devices while minimizing the impact to the cellular network that is broadcasting the WEA message. The availability of these alternative connections in urban locations could be relatively high. However, the availability of these alternate connections in rural or remote locations may be low or non-existent.

In accordance with the present disclosure, a network operator may provide enhanced services to WEA message originators in selected instances, while at the same time maintaining the integrity of the network infrastructure. For example, it is undesirable for a WEA message to cause an overload of the network such that users who need to make 911 emergency calls are unable to do so. Therefore, the present disclosure balances the benefits of delivering as much relevant information as possible via a WEA message, while at the same time ensuring that the network remains operational. These and other aspects of the present disclosure are described in greater detail below in connection with the discussion of FIGS. 1-4.

In addition to the foregoing, examples of the present disclosure may also be extended to provide additional functions. For instance, network analytic information (e.g., beyond a binary result as to whether a message content that deviates from a default format is permitted) may be shared outside of the cellular network operator. Recipients of network analytic information could include: an alert originator, local emergency management departments (e.g., where the local emergency management departments are not the alert originator), any software or system used by a WEA message originator for the automated generation of WEA messages, and so forth.

In one example, an order of the information in the WEA message could be arranged by a human alert originator, by any automated device or devices used by the alert originator for the generation of automated WEA alert messages, or by a cellular network component in a particular manner based upon the network analytic information. For example, the most critical information may be provided first if the threat is immediate. Otherwise, the WEA message may be arranged in a more readable manner if there is more time before the threat is manifest and if the network has available capacity. For instance, in one example the cellular network operator may provide a standardized default message content for each type of alert. The standardized message content may also comprise various options for message content to be used in connection with the same type of alert, or event, depending upon the network capacity. Thus, an alert originator may provide an alert type and an alert area, and the cellular network components may automatically select which version of the standardized message content to use depending upon the network analytic information, e.g., the current network usage, the anticipated increase in network usage in response to broadcasting the WEA message, any potential physical impacts to the network as a result of the threat, and so on.

Examples of the present disclosure may also provide a feedback mechanism to evaluate the reactions from past WEA messages, which can be beneficial in the creation of future WEA message content and structure. This feedback information could be of interest to the alert originators, the local emergency management departments, the wireless operators, and so forth.

Figure 1:
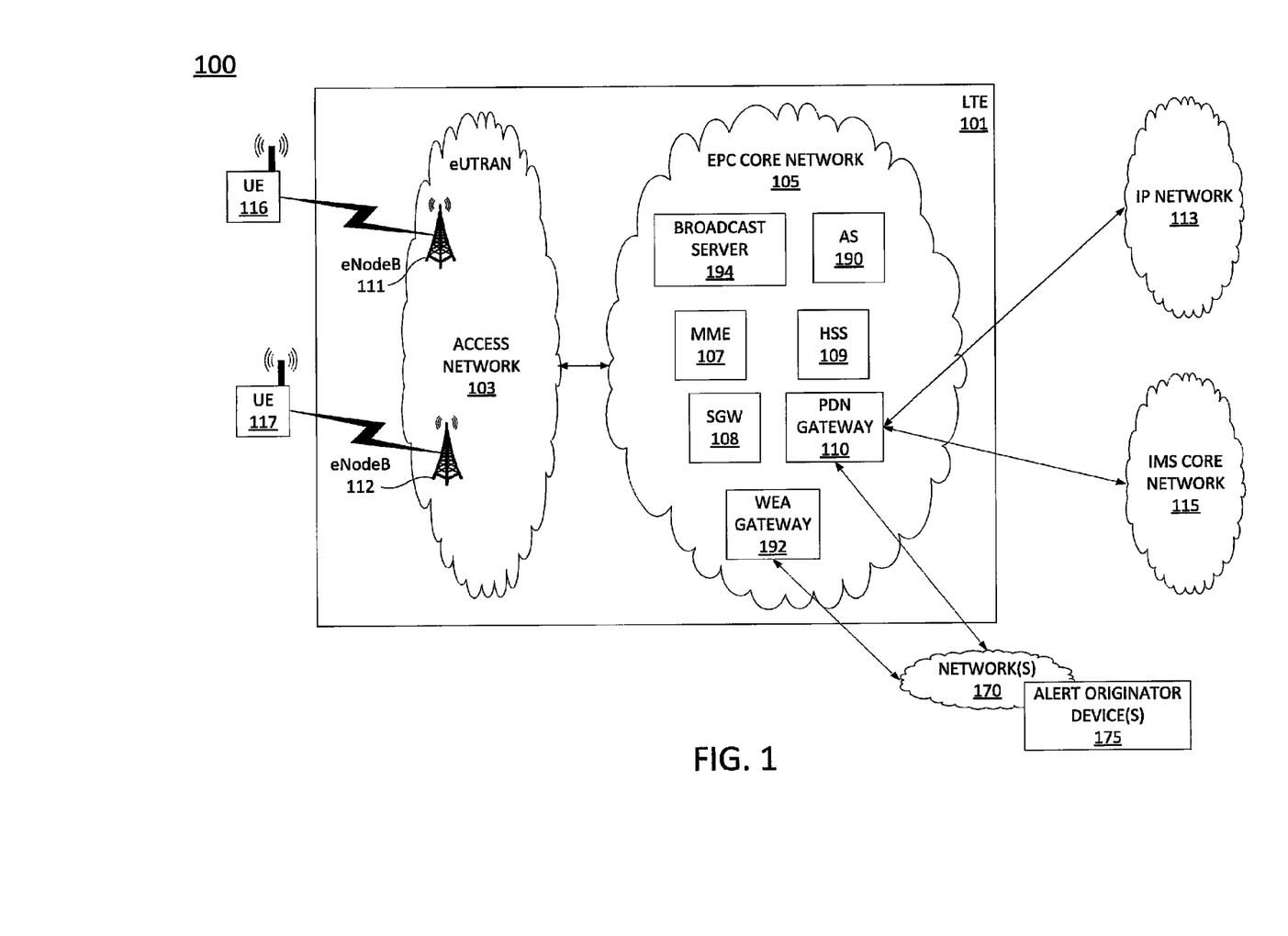
FIG. 1 illustrates an example system related to the present disclosure.

To better understand the present disclosure, FIG. 1 illustrates an example network, or system 100 suitable for implementing embodiments of the present disclosure for broadcasting a wireless emergency alert message and for providing alternative or additional information for a message content of a wireless emergency alert message. In one example, the system 100 comprises a Long Term Evolution (LTE) network 101, an IP network 113, and a core network, e.g., an IP Multimedia Subsystem (IMS) core network 115. In one example, system 100 is provided and operated by a cellular network operator. FIG. 1 also illustrates various user endpoint devices, e.g., LTE user endpoint devices 116 and 117. The user endpoint devices 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one example, the LTE network 101 comprises an access network 103 and a core network 105. In one example, the access network 103 comprises an evolved Universal Terrestrial Radio Access Network (eUTRAN). The eUTRANs are the air interfaces of the $3^{rd}$ Generation Partnership Project (3GPP) LTE specifications for mobile networks. In one example, the core network 105 comprises an Evolved Packet Core (EPC) network. An EPC network provides various functions that support wireless services in the LTE environment. In one example, an EPC network is an Internet Protocol (IP) packet core network that supports both real-time and non-real-time service delivery across a LTE network, e.g., as specified by the 3GPP standards. In one example, all eNodeBs in the access network 103 are in communication with the EPC network 105. In operation, LTE user equipment or user endpoints (UE) 116 may access wireless services via the eNodeB 111 and the LTE UE 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices Mobility Management Entity (MME) 107 and Serving Gateway (SGW) 108 support various functions as part of the LTE network 101. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW.

The EPC network 105 may also include an application server (AS) 190. In one embodiment, AS 190 may comprise a computing system, such as computing system 400 depicted in FIG. 4, and may be configured to provide one or more functions for broadcasting a wireless emergency alert message, for receiving alternative or additional information for a message content of a wireless emergency alert message, and for performing various other operations in accordance with the present disclosure. Accordingly, the AS 190 may be connected directly or indirectly to any one or more network elements of EPC network 105, and of the system 100 in general, that are configured to gather and forward network analytic information, such as signaling and traffic data, and other information and statistics to AS 190 and to receive instructions from AS 190. In addition, AS 190 may be configured to receive requests to broadcast wireless emergency alert messages from alert originator devices 175 deployed in one or more alert originating networks 170, each of which may be associated with an authorized alert originator. For example, one or more of the alert originator devices 175 may comprise all or a portion of a Federal Emergency Management Administration (FEMA) Integrated Public Alert and Warning System (IPAWS).

In one example, AS 190 may also be configured to provide authorizations to the alert originator devices 175 to utilize message content for wireless emergency alert messages that deviate from a default format, under certain network conditions. In one example, AS 190 may also be configured to broadcast WEA messages to mobile devices being served by wireless access networks in an alert area, such as UEs 116 and 117. For example, AS 190 may confirm that a message content for the WEA message and other aspects of the request, such as the time duration, the alert area, and so forth, conform to various requirements and then provide the WEA message to a broadcast server 194. The broadcast server 194 may provide the WEA message to eNodeB 111, eNodeB 112, and/or other eNodeBs, or similar access network components to be broadcast to mobile devices that are being serviced by the cells of the alert area. AS 190 may be further configured to perform other functions such as those described below in connection with the example methods 300 and 400 of FIGS. 3 and 4. In various examples, AS 190 may alternatively or additionally be referred to as a cell broadcast center (CBC), an emergency alert server (EAS), or a WEA server. In one example, AS 190 may be deployed in a network operations center (NOC) of a cellular network operator, e.g., an entity operating the EPC network 105, LTE network 101, access network 103, and so on. Due to the relatively large number of connections available between AS 190 and other network elements, none of the actual links to the application server are shown in FIG. 1. Similarly, links between MME 107, SGW 108, broadcast server 194, eNodeBs 111 and 112, PDN gateway 110, and other components of system 100 are also omitted for clarity.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, broadcast server 194 and/or other network components may be deployed in IMS core network 115 instead of being deployed within the EPC network 105, or in other portions of system 100 that are not shown, while providing essentially the same functionality.

In still another example, system 100 may be configured such that communications between alert originator devices 175 and AS 190 may bypass PDN gateway 110, and other components. For instance, dedicated gateways and network connections that are not shared with other external entities may be provided for guaranteeing access by alert originators device 175 to AS 190. For example, a WEA gateway 192 may be included as a point of ingress to and egress from EPC network 105 for communications between alert originator devices 175 in WEA networks 170 and AS 190 in EPC network 105. Such a WEA gateway 192 may alternatively be referred to as a commercial mobile service provider (CMSP) gateway or a commercial mobile alert system (CMAS) gateway. In addition, various elements of access network 103 and EPC network 105 are omitted for clarity, including gateways or border elements providing connectivity between such networks.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network and the like), for broadcasting a wireless emergency alert message and for providing alternative or additional information for a message content of a wireless emergency alert message. Thus, these and other modifications are all contemplated within the scope of the present disclosure.

Figure 2:
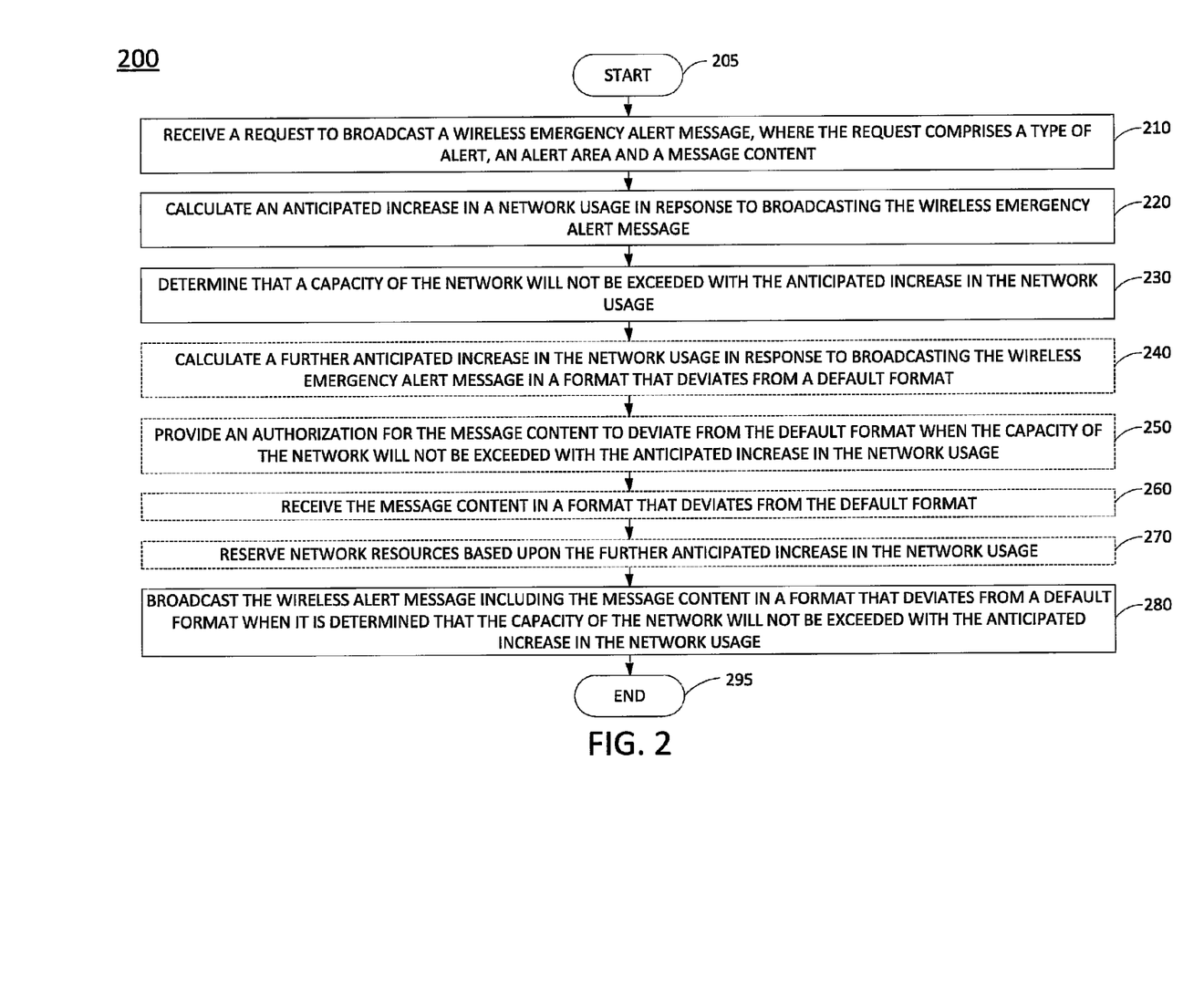
FIG. 2 illustrates a flowchart of an example method for broadcasting a wireless emergency alert message, according to the present disclosure.

FIG. 2 illustrates a flowchart of an example method 200 for broadcasting a wireless emergency alert (WEA) message. In one embodiment, the steps, operations or functions of the method 200 may be performed by any one or more of the components of the system 100 depicted in FIG. 1. For example, in one embodiment, the method 200 is performed by the application server (AS) 190. In another embodiment, the method 200 is performed by AS 190 in coordination with other components of the system 100, such as WEA gateway 192, broadcast sever 194, eNodeBs 111 and 112, and so forth. Alternatively, or in addition, one or more steps, operations or functions of the method 200 may be implemented by a computing device having a processor, a memory and input/output devices as illustrated below in FIG. 4, specifically programmed to perform the steps, functions and/or operations of the method. Although any one of the elements in system 100 of FIG. 1 may be configured to perform various steps, operations or functions of the method 200, the method will now be described in terms of an embodiment where steps of the method are performed by a processor, such as processor 402 in FIG. 4. For example, the processor may comprise a processor of a WEA server of a cellular network operator.

The method 200 begins in step 205 and proceeds to step 210. In step 210, the processor receives a request to broadcast a WEA message. In one example, the request comprises a type of alert, an area to which the alert pertains and a message content. In one example, the message content may have a default format, e.g., a format that conforms to a standardized protocol and/or that provides a minimum guaranteed quantity of data. In one example, the request may comprise multiple data fields that may include: an event type, an area affected, a recommended action, an expiration time (with time zone), a sending agency, and so forth. In one example, the request may include the foregoing fields and comprise 90 characters of alphanumeric text for presentation on the mobile devices of recipients. In one example, the "message content" may comprise the information contained in all or a portion of this set of data fields.

In one example, the request to broadcast the WEA message may also include message content that deviates from a default format. For example, the request may also include a "recommended action" that would cause the WEA message to exceed 90 characters. In another example, the request may include an image, audio, video, or other media file, a phone number to call for more information, a link to a network-based resource, and so on. In one example, the additional or alternative information may be indicated as being "additional" or "alternative," as described further below.

At step 220, the processor calculates an anticipated increase in a network usage in response to broadcasting the WEA message. The calculation of step 220 may utilize various parameters of current and past network analytic information to determine whether a message content of a WEA message may deviate from a standard, or default format. The current network analytic information may comprise parameters such as: the current network capacity, the current network usage/load in a portion of a network pertaining to an alert area, a number of mobile devices registered in the alert area, the types and proportions of different types of network traffic in the portions of the network related to the alert area, a level of non-cellular wireless coverage in the area, and so on. Historical network analytic information may comprise various measures of network performance with respect to various parameters following the broadcasting of previous WEA messages of a same or similar type as a current WEA message, various measures of network performance following the broadcasting of previous WEA messages of a same or similar type as a current WEA message that include a particular type of content that deviates from a default WEA message format, and so on. For instance, historical network analytic information may indicate how the network has been affected in the past by the same type of WEA message as a current WEA message, how the network usage, or load, has changed when a video link, or other media has been included in a WEA message in the past, and similar criteria.

In one example, the anticipated increase in network usage is calculated with respect to a portion of a cellular network that is associated with an alert area specified in the request received at step 210. In one example, the calculation of anticipated increase in network usage accounts for primary impacts, e.g., the anticipated network usage to initially broadcast the WEA message, plus secondary impacts, e.g., the anticipated network usage as a result of user behaviors after receiving the WEA message. However, since the broadcast of a WEA message may utilize dedicated network resources, the secondary impacts may be the network usage that is of most concern, while the primary impacts may have lesser relevance.

At step 230, the processor determines that a capacity of the network will not be exceeded with the anticipated increase in network usage. For example, step 230 may comprise adding a calculation of the anticipated increase in network usage to a current measure of the network usage. For example, the calculation of the anticipated increase in network usage may comprise a particular number of anticipated cellular voice calls in response to a broadcast of the WEA message in the alert area, and the current measure of network usage may comprise the current number of voice calls in the relevant portion of the network.

In one example, the anticipated increase in network usage plus the current measure of network usage is compared to a capacity of the network. The capacity of the network may be defined in a number of ways, such as a maximum concurrent number of voice calls, a maximum number of packet data protocol (PDP) contexts, a maximum bandwidth for a connection between network components, e.g., on a S1 interface between an eNodeB and a MME or SGW, an X2 interface between eNodeBs, and so forth. The capacity of the network with respect to these parameters may be defined at a peak capacity, or may be defined as another threshold, such as 80 percent capacity. For example, the network operator may determine that a network at 80 percent capacity for a particular parameter should not be considered as having spare capacity to support additional traffic. In one example, step 230 may comprise adding various calculations of anticipated increase in network usage for various parameters to various measures of current network usage for the same parameters. For example, if for any one of the parameters of network analytic information it is determined that the anticipated increase in network usage plus the current measure of network usage would exceed the capacity of the network, it may be determined that the network cannot handle the anticipated increase in network usage in the event that a WEA message was allowed to be broadcast in a format that deviates from a default format. On the other hand, if the capacity of the network is not determined to be exceeded based upon the anticipated increase in network usage in response to a broadcast of the WEA message, then the network may be determined to have spare capacity to handle a broadcast of a WEA message that deviates from the default format.

In one example, the determination that a capacity of the network will not be exceeded may account for the ability of the network to block or decrease certain aspects of network usage in order to free some network capacity. For example, certain traffic may be rerouted away from an affected area. As such, even if the peak network capacity would be exceeded based upon the current level of network usage and the anticipated increase in network usage, it may be determined for purposes of step 230 that the network capacity is not exceeded if it is determined that the network is capable of making adjustments to other traffic in order to accommodate the anticipated increase in network usage relating to the WEA message.

At optional step 240, the processor calculates a further anticipated increase in the network usage in response to broadcasting the WEA message in the format that deviates from the default format. As described above, the format that deviates from the default format may take several forms, such as an increased number of alphanumeric text characters in a sequence, the inclusion of a phone number to call, the inclusion of a URL or other link to a network-based resource, the inclusion of an image, audio, video or other type of media within the WEA message, and so forth. Notably, the anticipated increase in network usage may be different for the broadcast of WEA messages having these different deviations. For instance, the inclusion of a phone number to call for more information will have a different impact on network analytic information that the inclusion of a link to a network-hosted informational video. In one example, the same types of network analytic information and parameters utilized at step 220 may also be utilized in connection with the calculation at optional step 240. In addition, the anticipated increase in network usage for the broadcast of a WEA message having these various formats may change depending upon the alert area, the time of day, the type of alert, the identity of the alert originator, and so forth.

At optional step 250, the processor provides an authorization for the message content to deviate from a default format when the capacity of the network will not be exceeded with the anticipated increase in network usage. For instance, an alert originator may provide the request to broadcast the WEA message that is received at step 210, where the request includes a message content that conforms to a default format, e.g., 90 characters of alphanumeric text and including five recommended information fields, etc. Thus, the authorization provided at optional step 250 may allow the alert originator to decide to include additional or alternative information, such as: a longer alphanumeric message content, an image, audio, video or other media content, a link to an image, audio, video or other media content, and so forth, a phone number to call for more information, and so forth. In one example, the authorization provided at optional step 250 may comprise an authorization for one or more specific types of formats. For instance, some formats that deviate from the default format may be authorized, while other are not. For example, the inclusion of a URL link to a video may not be permitted when it is determined that the network may not be able to handle the increased network utilization if a large number of mobile devices were to attempt to stream the video instructions. On the other hand, it may be calculated that including further text instructions in addition to basic information regarding a threat would not be anticipated to cause the network capacity to be exceeded. Thus, additional text instructions may be permitted, while providing a URL may be denied.

At optional step 260, the processor receives the message content in a format that deviates from the default format. For example, the alert originator may elect to provide updated message content that has a particular format that has been authorized at optional step 250.

Notably, optional steps 240, 250 and 260 are considered optional insofar as the request to broadcast the WEA message that is received at step 210 may already be in a format that deviates from a default format, or may include "additional" or "alternative" forms of message content, e.g., a first version that conforms to the default format, and a second version that deviates from the default format. In such, case the second version may be selected for broadcasting at step 280, discussed below, when it is anticipated that the network has capacity to handle the anticipated increase in network usage that would result from broadcasting the WEA message with message content of the second version that deviates from the default format. Otherwise, the first version that conforms to the default format may be selected for broadcasting. In another example, both the first and second versions may be included in the broadcast of the WEA message.

At optional step 270, the processor reserves network resources based upon the further anticipated increase in network usage. For instance, the network may currently have a significant load of streaming video entertainment and network-based gaming traffic. Thus, it may be determined that such traffic may be rerouted away from the affected portion of the network in order to accommodate traffic relating to the WEA message to be broadcast. Accordingly, at optional step 270 the resources to accommodate the anticipated increase in network usage may be reserved in advance. In other words, in one example, it may be more desirable to have spare network capacity ready for use rather than to attempt to alter certain network usage in response to an actual overload condition. Notably, the quantity of network resources that may be reserved at optional step 270 may vary depending upon the current network usage, the specific type of deviation from the default format that the message content includes, and the anticipated increase in network usage that is calculated at step 220 and/or at optional step 240.

At step 280, the processor broadcasts the WEA message, including the message content in a format that deviates from a default format, when it is determined that the capacity of the network will not be exceeded with the anticipated increase in the network usage. In one example, the message content in the format that deviates from the default format is received as part of the request received at step 210. In another example, the message content in the format that deviates from the default format is received at optional step 260, e.g., in response to the authorization provided at optional step 250. In one example, the broadcasting of the WEA message is accomplished via a broadcast server and one or more base stations, radio network controllers, and/or similar cellular network components in an area to which the alert pertains. In addition, the WEA message may be received by all mobile devices being serviced by such portions of the cellular network and that are capable of receiving WEA messages.

Following step 280, the method 200 proceeds to step 295 where the method ends.

Figure 3:
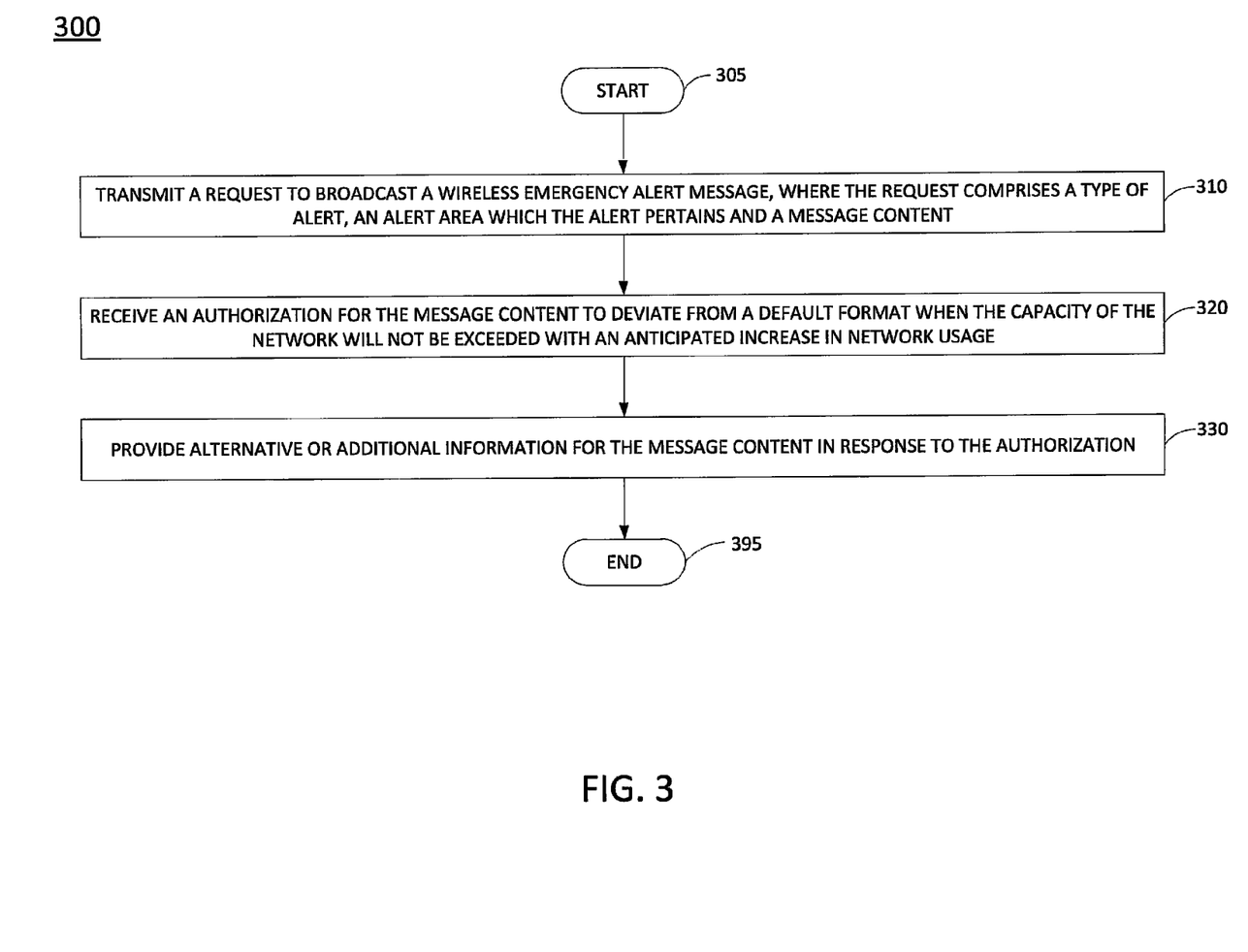
FIG. 3 illustrates a flowchart of an example method for providing alternative or additional information for a message content of a wireless emergency alert message, according to the present disclosure.

FIG. 3 illustrates a flowchart of a method 300 for providing alternative or additional information for a message content of a wireless emergency alert (WEA) message. In one embodiment, the steps, operations or functions of the method 300 may be performed by any one or more of the components of the system 100 depicted in FIG. 1, For example, in one embodiment, the method 300 is performed by one of alert originator devices 175. In another embodiment, the method 300 is performed by one of alert originator devices 175 in coordination with other components of the system 100, such as application server 190, WEA gateway 192, and so forth. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although various elements in system 100 of FIG. 1 may be configured to perform various steps, operations or functions of the method 300, the method will now be described in terms of an embodiment where steps of the method are performed by a processor, such as processor 402 in FIG. 4. For example, the processor may comprise a processor of an alert originator device.

The method 300 begins in step 305 and proceeds to step 310. In step 310, the processor transmits a request to broadcast a WEA message. The request may be transmitted to one or more components of a cellular network such as a WEA gateway, a commercial mobile service provider (CMSP) gateway and/or a commercial mobile alert system (CMAS) gateway, a cell broadcast center (CBC), an emergency alert server (EAS) and/or a WEA server, and so forth. In one example, the request includes a type of alert, an alert area and a message content. In one example, the message content may have a default format, e.g., a format that conforms to a standardized protocol and/or that provides a minimum guaranteed quantity of data. In one example, the request may comprise multiple data fields that may include: an event type, an area affected, a recommended action, an expiration time (with time zone), a sending agency, and so forth. For instance, the request may include the foregoing fields and comprise 90 characters of alphanumeric text for presentation on the mobile devices of recipients. In one example, the "message content" may comprise the information contained in all or a portion of this set of data fields. In one example, the request to broadcast the WEA message may be created by an authorized alert originator that is responsible for predicting and/or responding to various types of threats and emergencies.

At step 320, the processor receives an authorization for the message content to deviate from the default format. In one example, the authorization is received from the one or more components of the cellular network. For instance, an alert originator may provide the request to broadcast the wireless emergency alert message that is transmitted at step 310, where the request includes a message content that conforms to a default format. Thus, the authorization received at step 320 may allow the alert originator to decide to include additional or alternative information, such as: a longer alphanumeric message content, an image, audio, video or other media content, a link to an image, audio, video or other media content, a phone number to call for more information, and so forth.

In one example, the one or more components of the cellular network may determine that the message content may be permitted to deviate from a default format when it is determined that the capacity of the network, e.g., the portions of the network associated with the alert area, will not be exceeded with an anticipated increase in network usage as a result of broadcasting the WEA message. In one example, the authorization may include authorizations for specific types of message content, but may provide denials, or may simply omit authorizations for other types of message content. For instance, additional text instructions may be permitted, or providing a telephone number to contact for more information may be permitted, while providing a URL linking to an instructional video may be denied.

At step 330, the processor provides, e.g., to the cellular network, alternative or additional information for the message content in response to the authorization. In one example, the providing of the alternative or additional information causes the message content to deviate from a default format for broadcasting as part of a WEA message. For instance, the original message content transmitted at step 310 may comply with a 90 characters standard, whereas at step 330 the original message content may be extended and/or superseded to include alphanumeric text that extends beyond 90 characters. In another example, the message content may be extended to include a media content, a phone number, a URL or similar link to a network-based resource, and so on. In one example, the alternative or additional information may be received by the processor via an input from an alert originator before the processor provides the alternative or additional information for the message content to the cellular network. In another example, the alternative or additional information may be selected automatically, e.g., without further human input, by the processor for providing at step 330 in response to receiving the authorization at step 320. For example, prior to the transmitting at step 310, a person associated with an alert originator may provide a message content that complies with the default format as well as an alternative or additional message content that the alert originator would prefer to have broadcast. The processor may then transmit the request at step 310 with the message content that complies with the default format, and may temporarily store the alternative or additional information for the message content. Thus, if authorization is received at step 320, the processor may automatically respond at step 330 with the alternative or additional information for the message content.

Following step 330, the method 300 proceeds to step 395 where the method ends.

In addition, although not specifically specified, one or more steps, functions or operations of the method 200 or the method 300 may include a storing, displaying and/or outputting step as required for a particular application. In other words, any data, records, fields, and/or intermediate results discussed in the method 200 or the method 300 can be stored, displayed, and/or outputted either on the device executing the respective method or to another device, as required for a particular application.

Furthermore, steps, blocks, functions, or operations in FIGS. 2 and 3 that recite a determining operation or involve a decision do not necessarily require that both branches of the determining operation be practiced. In other words, one of the branches of the determining operation can be deemed as an optional step. Moreover, steps, blocks, functions, or operations of the above described method 200 or method 300 can be combined, separated, omitted, and/or performed in a different order from that described above, without departing from the examples of the present disclosure.

As such, the present disclosure provides at least one advancement in the technical field of cellular wireless emergency alert broadcasting. In particular, in one example, the present disclosure enables a network operator to provide enhanced services to alert originators in selected instances, while at the same time maintaining the integrity of the network infrastructure. For example, it is undesirable for a WEA message to cause an overload of the network such that users who need to make 911 emergency calls are unable to do so. Therefore, the present disclosure balances the benefits of delivering as much relevant information as possible via a WEA message, while at the same time ensuring that the network remains operational. The present disclosure also provides a transformation of data. For example, network analytic data may be transformed into data comprising a determination as to whether a message content for a WEA message that deviates from a default format is to be permitted, a determination of specific types of deviations that may be permitted, and so forth.

Finally, examples of the present disclosure improve the functioning of a computing device, e.g., a server. Namely, new types of servers or server components for broadcasting a WEA message are provided. For example, a server of the present disclosure may calculate an anticipated increase in a network usage in response to broadcasting a WEA message, authorize message content to deviate from a default format when it is determined that a capacity of the network will not be exceeded with the anticipated increase in network usage, and broadcast the WEA message including message content that deviates from the default format. Notably, no previous server has performed these functions as described herein. For example, previous devices or servers may simply broadcast a WEA message that complies with a default format via dedicated broadcast resources without considering the network impacts of the broadcasting of the WEA message.

In addition, a new type of server, e.g., an alert originator device for providing alternative or additional information for a message content of a WEA message, is also provided. For example, an alert originator device of the present disclosure may transmit to a cellular network a request to broadcast a WEA message, receive an authorization for the message content to deviate from a default format and provide alternative or additional information for the message content in response to the authorization. Notably, no previous server has performed the functions of an alert originator device that provides alternative or additional information for a message content of a WEA message, as described herein. For example, previous devices or servers may simply provide to a cellular network operator a request to broadcast a WEA message that complies with a default format.

Figure 4:
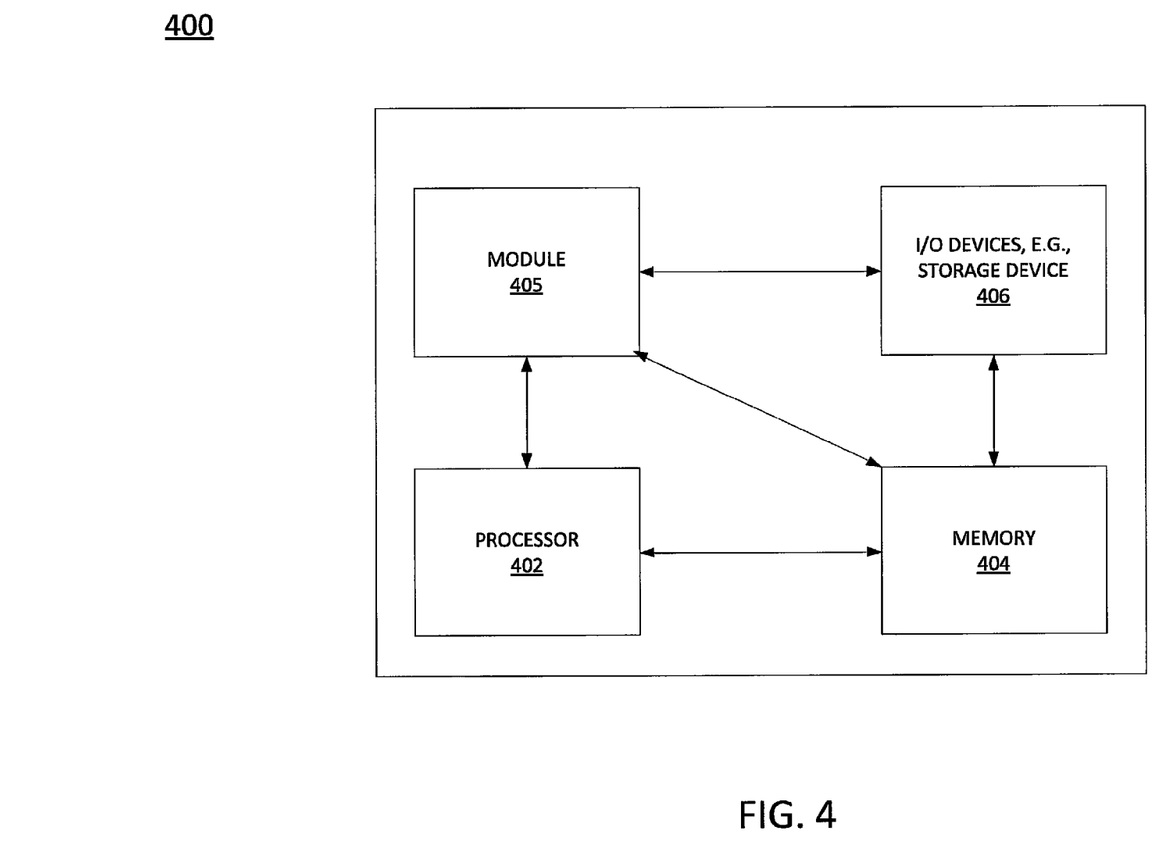
FIG. 4 illustrates a high-level block diagram of a computing device specially configured to perform the functions, methods, operations and algorithms described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for broadcasting a wireless emergency alert message and/or for providing alternative or additional information for a message content of a wireless emergency alert message, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 402 can also be configured or programmed to cause other devices to perform one or more operations as discussed above. In other words, the one or more hardware processors 402 may serve the function of a controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods. In one embodiment, instructions and data for the present module or process 405 for broadcasting a wireless emergency alert message and/or for providing alternative or additional information for a message content of a wireless emergency alert message (e.g., a software program comprising computer-executable instructions) can be loaded into memory 404 and executed by hardware processor element 402 to implement the steps, functions or operations as discussed above in connection with the illustrative methods 200 and/or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer-readable or software instructions relating to the above described methods can be perceived as a programmed processor or a specialized processor. As such, the present module 505 for broadcasting a wireless emergency alert message and/or for providing alternative or additional information for a message content of a wireless emergency alert message (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a processor, a request to broadcast a wireless emergency alert message, wherein the request comprises a type of alert, an alert area, and a message content;
   calculating, by the processor, an anticipated increase in a network usage of a network, wherein the anticipated increase is in response to broadcasting the wireless emergency alert message;
   determining, by the processor, that a capacity of the network will not be exceeded with the anticipated increase in the network usage; and
   broadcasting, by the processor, the wireless emergency alert message in the alert area, wherein the wireless emergency alert message includes the message content, wherein, when it is determined that the capacity of the network will not be exceeded with the anticipated increase in the network usage, the message content is in a format that deviates from a default format.

2. The method of claim 1, further comprising:
   providing an authorization for the message content to deviate from the default format when the capacity of the network will not be exceeded with the anticipated increase in the network usage, wherein the request that is received includes the message content in the default format; and
   receiving the message content in the format that deviates from the default format, prior to the broadcasting, in response to the authorization.

3. The method of claim 1, wherein the message content is in a format that deviates from the default format when the request is received.

4. The method of claim 1, where the default format comprises a fixed-size of the message content.

5. The method of claim 4, wherein the fixed-size of the message content comprises 90 characters.

6. The method of claim 4, wherein the format that deviates from the default format comprises a size of the message content exceeding the fixed-size.

7. The method of claim 4, wherein the default format comprises an alphanumeric sequence.

8. The method of claim 7, wherein the format that deviates from the default format comprises:
   an image content;
   a telephone number;
   a video content; or
   an audio content.

9. The method of claim 7, wherein the format that deviates from the default format comprises a link to a network-based resource.

10. The method of claim 9, wherein the network-based resource comprises:
    a server;
    a webpage;
    a document;
    an image content;
    a video content; or
    an audio content.

11. The method of claim 1, wherein the request is received from a device of an alert originator.

12. The method of claim 1, wherein the processor comprises a component of a cellular network, wherein the broadcasting the wireless emergency alert message comprises broadcasting the wireless emergency alert message via a cellular broadcast channel.

13. The method of claim 1, wherein the anticipated increase in the network usage is calculated based upon past network usage information associated with the type of alert and the alert area.

14. The method of claim 1, wherein the determining that the capacity of the network will not be exceeded with the anticipated increase in the network usage is based upon a calculation of the anticipated increase in the network usage plus a current measure of the network usage.

15. The method of claim 1, further comprising:
    calculating a further anticipated increase in the network usage in response to the broadcasting the wireless emergency alert message with the message content in the format that deviates from a default format; and
    reserving network resources based upon the further anticipated increase in the network usage, wherein the network resources are reserved for mobile devices that are to receive the wireless emergency alert message that is broadcast.

16. The method of claim 1, further comprising:
    calculating a further anticipated increase in the network usage in response to the broadcasting the wireless emergency alert message with the message content in the format that deviates from a default format, wherein the request that is received includes the message content in the default format; and
    providing an authorization for the message content to comprise the format that deviates from the default format when the capacity of the network will not be exceeded with the further anticipated increase in the network usage.

17. A non-transitory computer-readable medium storing instructions which, when executed by a processor, cause the processor to perform operations, the operations comprising:
    receiving a request to broadcast a wireless emergency alert message, wherein the request comprises a type of alert, an alert area, and a message content;
    calculating an anticipated increase in a network usage of a network, wherein the anticipated increase is in response to broadcasting the wireless emergency alert message;
    determining that a capacity of the network will not be exceeded with the anticipated increase in the network usage; and broadcasting the wireless emergency alert message in the alert area, wherein the wireless emergency alert message includes the message content, wherein, when it is determined that the capacity of the network will not be exceeded with the anticipated increase in the network usage, the message content is in a format that deviates from a default format.

18. The non-transitory computer-readable medium of claim 17, wherein the operations further comprise:
providing an authorization for the message content to deviate from the default format when the capacity of the network will not be exceeded with the anticipated increase in the network usage, wherein the request that is received includes the message content in the default format; and
receiving the message content in the format that deviates from the default format, prior to the broadcasting, in response to the authorization.

19. A device, comprising:
a processor; and
a non-transitory computer-readable medium storing instructions which, when executed by the processor, cause the processor to perform operations, the operations comprising:
receiving a request to broadcast a wireless emergency alert message, wherein the request comprises a type of alert, an alert area, and a message content;
calculating an anticipated increase in a network usage of a network, wherein the anticipated increase is in response to broadcasting the wireless emergency alert message;
determining that a capacity of the network will not be exceeded with the anticipated increase in the network usage; and
broadcasting the wireless emergency alert message in the alert area, wherein the wireless emergency alert message includes the message content, wherein, when it is determined that the capacity of the network will not be exceeded with the anticipated increase in the network usage, the message content is in a format that deviates from a default format.

20. The device of claim 19, wherein the operations further comprise:
providing an authorization for the message content to deviate from the default format when the capacity of the network will not be exceeded with the anticipated increase in the network usage, wherein the request that is received includes the message content in the default format; and
receiving the message content in the format that deviates from the default format, prior to the broadcasting, in response to the authorization.

* * * * *